Patented Oct. 30, 1945

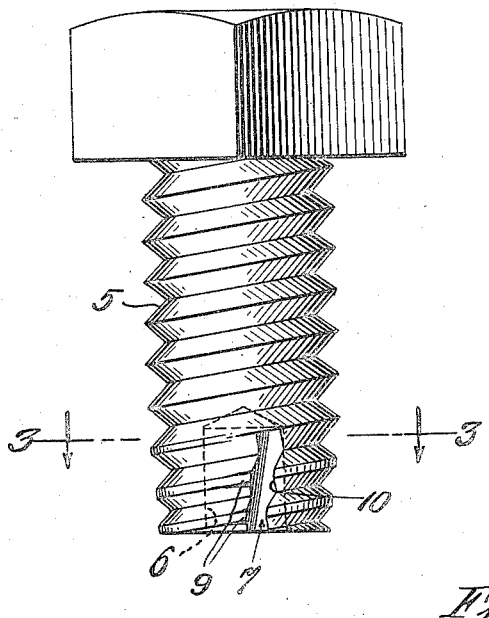
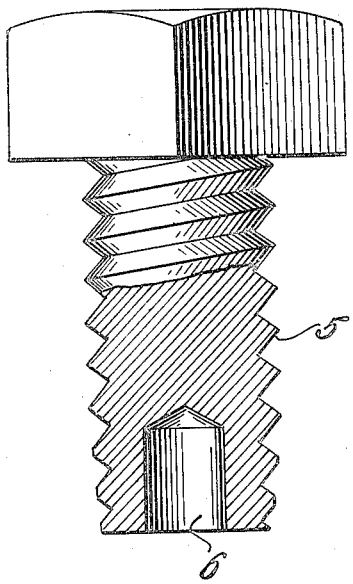
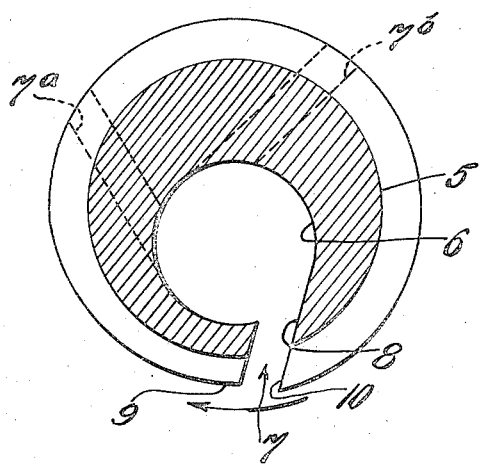

2,387,720

UNITED STATES PATENT OFFICE 2,387,720

SELF-THREADING SCREW

Frank L. Davis, College Point, Long Island, N. Y.

Application June 26, 1944, Serial No. 542,186

4 Claims. (Cl. 85—47)

The invention herein disclosed relates to screws of the type designed to cut their own screw threads and objects of the invention are to provide a bolt or screw of this nature, which while effectively cutting its way will carry off and dispose of the material cut from the thread groove.

Further objects are to accomplish the cutting of the thread by a smooth, easy angle, planing action, rather than by a tearing or milling operation.

Other objects of the invention are to provide a basic design of self-threading screw, which will be capable of modification to locate the cutting blade portion of the same at different angles, to meet different special requirements.

Other objects and the novel features by which the purposes of the invention are attained are hereinafter set forth or will appear in the course of the following specification.

The drawing accompanying and forming part of the specification illustrates a present typical embodiment of the invention, but structure may be modified and changed within the true intent and scope of the invention, as hereinafter defined and claimed.

Fig. 1 in the drawing is a side elevation of a self-threading bolt having features of the invention incorporated therein.

Fig. 2 is a part longitudinal sectional view of the same.

Fig. 3 is an enlarged transverse sectional view as on substantially the plane of line 3—3 of Fig. 1.

In the illustration, the screw member is shown in the form of a square headed bolt 5.

The entering end of this screw member has a cylindrical bore or recess 6, therein, which is eccentrically disposed, after the manner indicated in Fig. 3.

A slot 7, is cut through the wall of the bolt tangential to the bore and inclined forwardly in the screw threading direction, thus to form a tangential planing surface 8.

At the forward edge of the slot 7, the ridges of the screw threads may be flattened or reduced as indicated at 9, in Figs. 1 and 3, to provide clearance for the planing edges 10, and allow for easy entry of the cut material into the throat provided by the slot 7.

The eccentricity of the hole in the end of the bolt allows for a wide variation of tangent cutting angles and for location of the slot in either a thin or a thicker portion of the wall of the tubular part of the bolt. Thus in Fig. 3, broken lines indicate at 7a and 7b, how the slot, or slots, if there be more than one, may be disposed at different tangent inclines and in different thickness wall portions of the bolt.

The eccentrically disposed hole may be cut substantially the depth of the normal thickness in which the bolt or screw is to be used and as indicated in Fig. 1, the slot or slots 7, may be inclined instead of parallel with the longitudinal axis of the bolt.

The eccentricity of the bore enables the slots to be cut at the best planing angles for the different materials in which the screws are to be used. For example, screws designed to be used in metal may have slots disposed at a different incline from those intended to be used for plastic materials. In all instances however, the material planed by the cutting edges is directed smoothly and easily into the bore, where it may curl or form into one or more coils, automatically discharging from the tubular end of the screw.

What is claimed is:

1. A thread cutting screw member having a longitudinal eccentrically disposed hole in the entering end of the same and located completely within the body of said member and there being a slot cut through said member tangentially into the eccentrically disposed hole to provide a tangential planing edge.

2. A self-threading screw member having a longitudinally extending eccentrically disposed bore of circular cross section in the entering end of the same and located completely within the body of said member and a slot extending through the side of the screw member tangentially into said eccentrically disposed bore and inclined forwardly in the screw-threading direction.

3. A self-threading screw member having a longitudinally extending eccentrically disposed bore of circular cross section in the entering end of the same and located completely within the body of said member and a slot extending through the side of the screw member tangentially into said eccentrically disposed bore and inclined forwardly in the screw-threading direction, the ridges of the screw threads at the forward side of said slot being lowered to admit entry of cut material into said slot.

4. A thread cutting screw member having a longitudinally extending eccentrically disposed bore in the entering end of the same and located completely within the screw-threaded body of said member, the screw-threaded wall of the member surrounding said bore being cut through by a longitudinally extending parallel-sided slot entering the bore on an incline tangent to the peripheral surface of the bore and inclined forwardly in the direction of screw thread advance and with the outer side of the slot in tangent relation to the periphery of the bore.

FRANK L. DAVIS.